US008514589B2

(12) United States Patent
Mikami

(10) Patent No.: US 8,514,589 B2
(45) Date of Patent: Aug. 20, 2013

(54) ELECTRONIC APPARATUS

(75) Inventor: Masashi Mikami, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 97 days.

(21) Appl. No.: 13/109,841

(22) Filed: May 17, 2011

(65) Prior Publication Data

US 2011/0216509 A1 Sep. 8, 2011

Related U.S. Application Data

(62) Division of application No. 11/644,636, filed on Dec. 21, 2006, now Pat. No. 7,952,886.

(30) Foreign Application Priority Data

Feb. 27, 2006 (JP) ................................ 2006-050600

(51) Int. Cl.
*H02B 1/01* (2006.01)

(52) U.S. Cl.
USPC ........... 361/825; 361/695; 361/753; 361/799; 361/818; 361/829; 174/135; 174/254; 174/260; 174/382; 174/387; 439/99; 439/131; 439/497; 439/582; 439/888

(58) Field of Classification Search
USPC ................. 361/752, 695, 679, 753, 799, 818, 361/829; 174/78, 135, 254, 260, 261, 382, 174/387; 439/40, 99, 131, 497, 582, 888
See application file for complete search history.

(56) References Cited

U.S. PATENT DOCUMENTS 3,810,186 A * 5/1974 Nakahara et al. ............. 343/771
4,181,384 A * 1/1980 Dola et al. ..................... 439/497
4,576,248 A * 3/1986 Marom ............................. 182/5
6,125,029 A * 9/2000 Sasaki et al. ............. 361/679.28
6,294,735 B1 * 9/2001 Sobel et al. ...................... 174/67
6,315,249 B1 * 11/2001 Jensen et al. ..................... 248/65
6,466,728 B1 * 10/2002 Radloff et al. ................ 385/140
2006/0070809 A1 * 4/2006 Barzilai ........................ 182/193

* cited by examiner

*Primary Examiner* — Xiaoliang Chen
(74) *Attorney, Agent, or Firm* — Blakely, Sokoloff, Taylor & Zafman LLP

(57) ABSTRACT

According to one embodiment, an electronic apparatus is provided with a first housing that comprises a first ground and a second housing comprising a second ground. The electronic apparatus further comprises (i) a plurality of first protrusions on an inner surface of the first housing, at least one of the plurality of first protrusions comprising, on a peripheral surface thereof, a first conductor electrically connected to the first ground; (ii) a hinge pivotably connecting the first housing and the second housing; and (iii) a cable extending between inside the first housing and inside the second housing through the hinge, supported by the plurality of first protrusions, electrically connected to the first conductor in the first housing, and electrically connected to the second ground in the second housing, the cable electrically connecting the first ground and the second ground.

15 Claims, 7 Drawing Sheets

ELECTRONIC APPARATUS

CROSS-REFERENCE TO RELATED APPLICATIONS

This application is a divisional of U.S. patent application Ser. No. 11/644,636 filed Dec. 21, 2006, now U.S. Pat. No. 7,952,886, which is based upon and claims the benefit of priority from Japanese Patent Application No. 2006-050600, filed Feb. 27, 2006, the entire contents of which are incorporated herein by reference.

BACKGROUND

1. Field

One embodiment of the invention relates to an electronic apparatus including a cable and to, for example, a structure for grounding a film of the cable.

2. Description of the Related Art

An electronic apparatus, such as a portable computer, is provided with cables for connecting various modules that are mounted in a case.

An electrical equipment box with harness fixing members is disclosed in Jpn. Pat. Appln. KOKAI Publication No. 2003-124649. A plurality of harness fixing members of this electrical equipment box protrude from a side face plate of the box. They are arranged in zigzag fashion and hold a cable of a harness.

In grounding a film of the cable to a ground layer of the case, for example, the cable may be pressed against the ground layer by using, e.g., sheet metal. Alternatively, a ground wire may be attached to the cable film so that it is connected to the ground layer. Thus, in grounding the cable film, the case must be additionally provided with a separate member for grounding.

Despite the use of the harness fixing members of the electrical equipment box, for example, the separate member for grounding is needed to ground the cable film.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus is provided with a case, a module contained in the case, a ground provided in the case, a plurality of protrusions which protrude from an inner surface of the case, and a cable connected electrically to the module. At least one of the protrusions includes, on a side face thereof, a conductor connected electrically to the ground. The cable includes an electrically conductive film and is supported by the respective side faces of the protrusions.

Embodiments of the present invention applied to portable computers will now be described with reference to the accompanying drawings.

Figure 1:
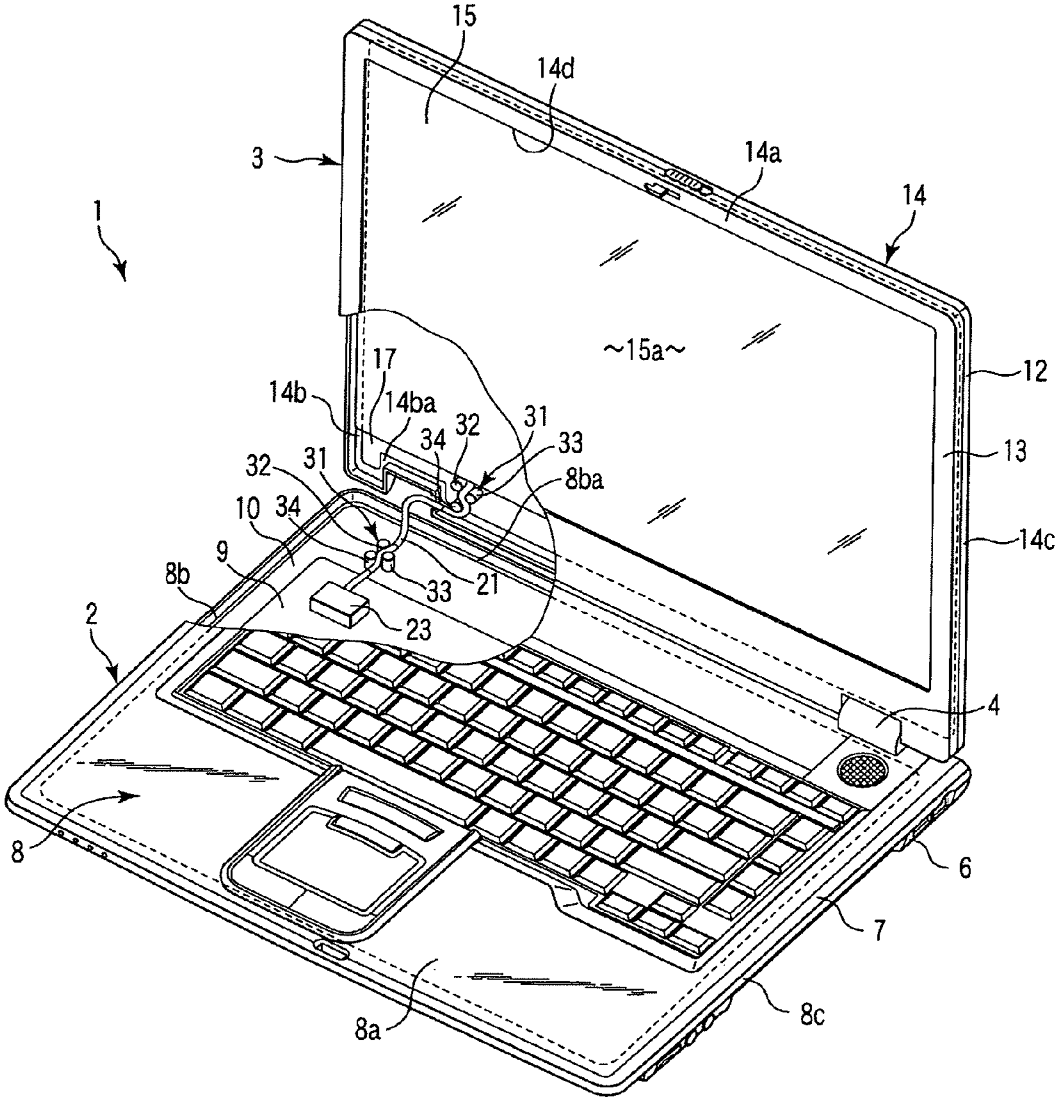
FIG. 1 is an exemplary perspective view of a portable computer according to a first embodiment of the invention.
Figure 2:
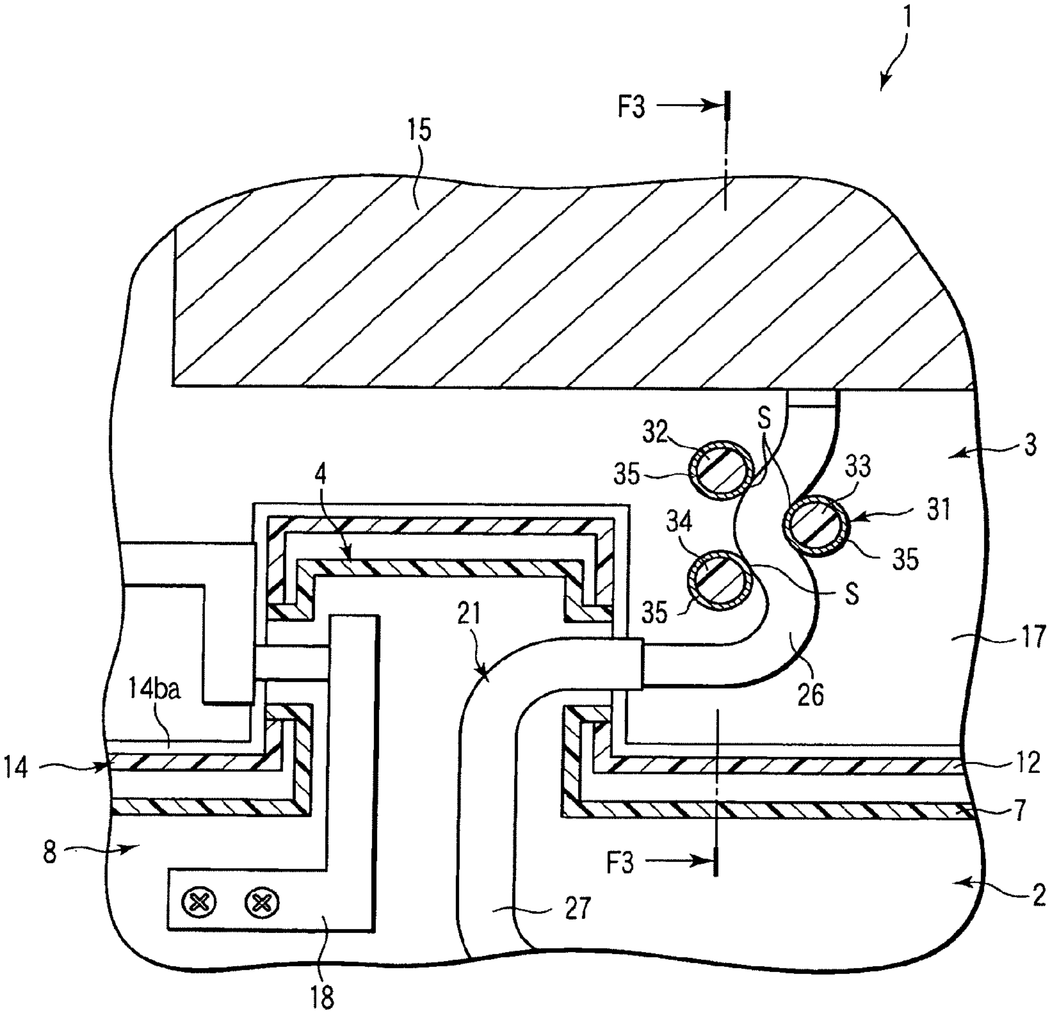
FIG. 2 is an exemplary sectional view of protrusions according to the first embodiment.
Figure 3:
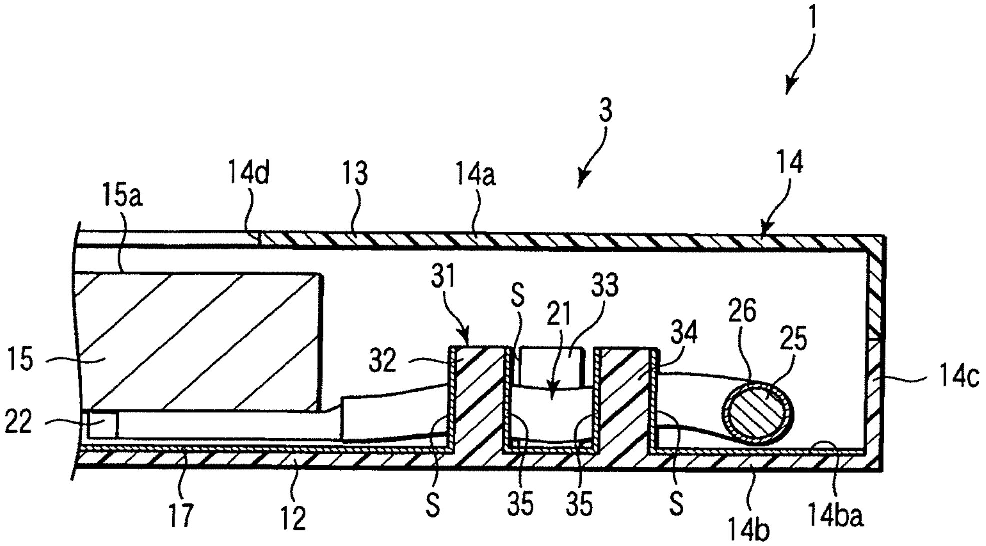
FIG. 3 is an exemplary sectional view of the protrusions taken along line F3-F3 of FIG. 2.

FIGS. 1 to 3 show a portable computer 1 as an electronic apparatus according to a first embodiment of the invention. As shown in FIG. 1, the portable computer 1 is provided with a body 2, a display unit 3, and a pair of hinge sections 4 located between the body 2 and the display unit 3.

As shown in FIG. 1, the body 2 is provided with a body base 6 and a body cover 7. The body base 6 is an example of a first housing member. The body cover 7 is an example of a second housing member. The cover 7 is combined with the base 6 from above. Thus, the body 2 is provided with a box-shaped case 8 that has a top wall 8*a*, a bottom wall 8*b*, and a side wall 8*c*. The case 8 contains a circuit board 9 therein. The circuit board 9 is an example of a module.

An inner surface 8*ba* of the case bottom wall 8*b* is provided with a first ground layer 10. The first ground layer 10 is formed by coating or plating with, for example, an electrically conductive material.

The display unit 3 is provided with a housing base 12 (so-called cover) and a housing cover 13 (so-called mask). The base 12 is an example of a first housing member. The cover 13 is an example of a second housing member. The cover 13 is combined with the base 12. Thus, the display unit 3 is provided with a box-shaped display housing 14 that has a front wall 14*a*, a rear wall 14*b*, and a side wall 14*c*.

The display housing 14 contains a liquid crystal display module 15 therein. The module 15 has a display screen 15*a*. The screen 15*a* is exposed to the outside of the display housing 14 through an opening 14*d* in the front wall 14*a*.

As shown in FIG. 1, an inner surface 14*ba* of the display housing rear wall 14*b* is provided with a second ground layer 17. The second ground layer 17 is formed by coating or plating with, for example, an electrically conductive material. However, the first and second ground layers 10 and 17 may be formed by lamination of, for example, metal foil of aluminum or copper that is spread thinly.

The hinge sections 4 are provided at the rear end portion of the body 2 and support the display unit 3. As shown in FIG. 2, each hinge section 4 has a rockable hinge mechanism 18 therein. Thus, the display unit 3 is swingable between a closed position in which it is leveled to cover the top wall 8*a* of the body 2 from above and an open position in which it rises to allow the top wall 8*a* to be exposed.

The portable computer 1 has a harness 21 that ranges from the body 2 to the display unit 3. Specifically, the harness 21 extends within the display housing 14 into case 8 through the hinge sections 4. The harness 21 is an example of a cable. As shown in FIG. 3, one end of the harness 21 has a first connector 22. The harness 21 is connected electrically to the liquid crystal display module 15 by the first connector 22. As shown in FIG. 1, the other end of the harness 21 has a second connector 23. The harness 21 is connected electrically to the circuit board 9 by the second connector 23.

As shown in FIGS. 2 and 3, the harness 21 has an electric wire portion 25, a film shield 26, and an insulating film 27. The wire portion 25 is formed by binding together, for example, power lines, signal lines, etc. The film shield 26 is formed of an electrically conductive film and encloses the wire portion 25. An electrically conductive cloth tape is an example of the film shield 26. However, the film shield 26 is not limited to the cloth tape but may alternatively be an electrically conductive tube.

Although an example of the film shield 26 is a film as an electromagnetic interference (EMI) countermeasure, it may be replaced with a film shield provided for any other purpose. The insulating film 27 further encloses the film shield 26. An example of the insulating film 27 is a insulating tape.

The body 2 and the display unit 3 have their respective protrusive sections 31 therein. The following is a detailed description of the protrusive section 31 of the display unit 3. Since the protrusive section 31 of the body 2 has the same configuration and function as the protrusive section 31 of the display unit 3, like numerals are used to designate like counterparts, and a description thereof is omitted.

As shown in FIG. 2, the protrusive section 31 is located in the path of the harness 21 between the liquid crystal display module 15 and the hinge section 4. The protrusive section 31 has first, second, and third protrusions 32, 33 and 34 that individually protrude from the inner surface 14*ba* of the rear wall 14*b*. Each of the first to third protrusions 32 to 34 is a cylinder that is formed integrally with the housing base 12. In other words, side surfaces of the protrusions are formed in curved surface shape.

The first to third protrusions 32 to 34 are different levels mutually in, for example, two rows. In other words, they are arranged in a zigzag. The width of an example of a gap between the first and second protrusions 32 and 33 is substantially equal to the outside diameter of the film shield 26 of the harness 21. The width of an example of a gap between the third and second protrusions 34 and 33 is also substantially equal to the outside diameter of the film shield 26.

As shown in FIGS. 2 and 3, each of the first to third protrusions 32 to 34 has a conductor layer 35 on its side face S (i.e., peripheral surface). The conductor layer 35 is an example of a conductor of the protrusions. One example of the conductor layer 35 is formed integrally with the second ground layer 17 by plating and connected electrically to the layer 17. However, the conductor layer 35 may be formed independently of the second ground layer 17 only if it is connected electrically to the layer 17.

At least one of the first to third protrusions 32 to 34 is expected only to have the conductor layer 35. Instead of having the conductor layer 35 on its surface, each of the first to third protrusions 32 to 34 themselves may be formed of a conductor material, such as metal.

As shown in FIG. 2, that part of the harness 21 which threads through the protrusive section 31 has no insulating film 27, so that the film shield 26 is exposed at that part. The harness 21 that extends from the liquid crystal display module 15 has its trunk portion caught by the first to third protrusions 32 to 34 and is led around along the protrusions 32 to 34 for use as guides.

The harness 21 is mounted threading between the first and second protrusions 32 and 33 and between the third and second protrusions 34 and 33. The harness 21 is held between the first and second protrusions 32 and 33 and between the third and second protrusions 34 and 33, whereby its position is fixed. The harness 21 is supported in a meandering form by the first to third protrusions 32 to 34 that are arranged in a zigzag. The harness 21 that extends in the hinge sections 4 is slightly bent to enjoy some play.

The following is a description of the operation of the portable computer 1.

As the harness 21 is held between the first to third protrusions 32 to 34, its film shield 26 touches the respective conductor layers 35 of the protrusions 32 to 34. The film shield 26 is grounded to the second ground layer 17 through the conductor layers 35. As the film shield 26 is grounded, generation of electromagnetic radiation in the portable computer 1 is suppressed.

On the other hand, the film shield 26 of the harness 21 that extends in the body 2 is held by the protrusive section 31 in the body case 8 and grounded to the first ground layer 10. Specifically, the first and second ground layers 10 and 17 connect with each other through the film shield 26 of the harness 21 so that they have the same potential. Thus, generation of disturbance electromagnetic radiation that is attributable to a difference in potential between the two ground layers 10 and 17 is suppressed.

According to the portable computer 1 constructed in this manner, the film of the harness 21 can be grounded without providing the case 8 with any separate member. Thus, the film shield 26 can be grounded by providing the protrusions 32, 33 and 34 that have the conductor layers 35 on their respective side faces S and wiring the harness 21 in mesh with the protrusions 32 to 34. In other words, it is unnecessary to use any separate member that presses the harness 21 against the second ground layer 17 or any ground wire to be separately attached to the film shield 26.

Thus, a grounding structure can be achieved using less space than a conventional one, so that the portable computer 1 can be miniaturized. Since no separate members are required, moreover, the portable computer 1 can be reduced. The film shield 26 can be grounded by holding the harness 21 between the protrusions 32, 33 and 34. Specifically, laborious operation for mounting a separate member can be omitted, so that the portable computer 1 can be obtained with improved assemblability.

If the harness 21 is supported by the first to third protrusions 32 to 34 in a meandering form, in particular, the harness 21 is held more firmly between the protrusions, so that the film shield 26 can be grounded securely.

At least one of the protrusions is expected to have the conductor layer 35. If a plurality of protrusions have their respective conductor layers 35, however, the ground connection can be achieved with a lower electrical resistance.

Each of the first to third protrusions 32 to 34 is not limited to the shape of a cylinder but may be in the shape of, for example, a wall that extends along the harness 21. If that surface of each protrusion which touches the harness 21 is in the form of a curved surface, the area of contact between the film shield 26 and the conductor layer 35 increases, so that the ground connection can be achieved with a lower electrical resistance.

The protrusions are not limited to three in number but may be two or four or more. Further, the array of the protrusions is not limited to the zigzag configuration but may be of any other suitable configuration.

Figure 4:
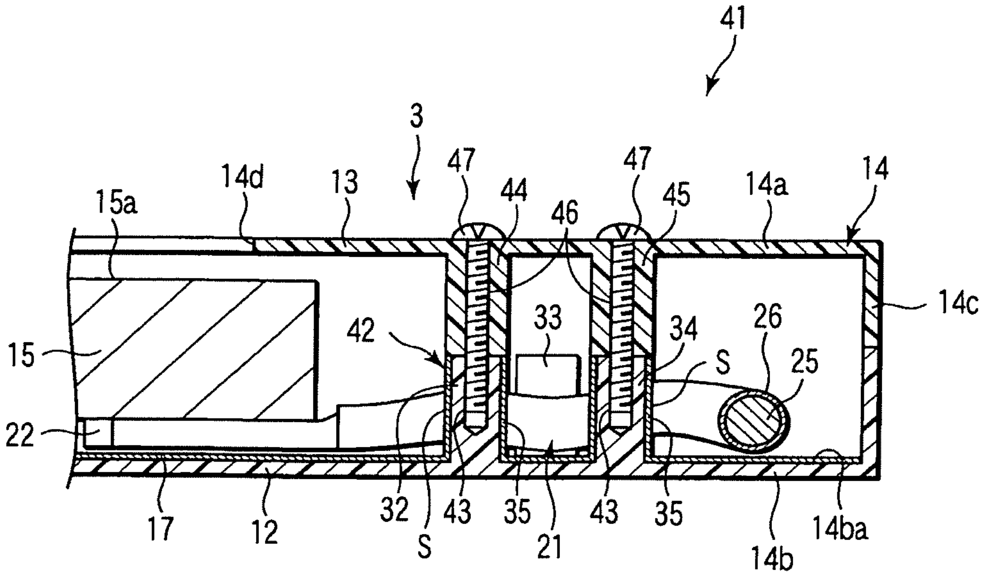
FIG. 4 is an exemplary sectional view of a portable computer according to a second embodiment of the invention.

A portable computer 41 as an electronic apparatus according to a second embodiment of the invention will now be described with reference to FIG. 4. Like numerals are used to designate those configurations which have the same functions as those of the portable computer 1 according to the first embodiment, and a description thereof is omitted.

The portable computer 41 has a protrusive section 42. First and third protrusions 32 and 34 of the protrusive section 42 individually have threaded holes 43 that open in their respective top portions. Each threaded hole 43 is an example of an engaging hole.

A housing cover 13 of the portable computer 41 has first and second bosses 44 and 45. The first boss 44 extends from a front wall 14*a* toward the first protrusion 32 and faces the protrusion 32. The second boss 45 extends from the front wall 14*a* toward the third protrusion 34 and faces the protrusion 34.

First and second bosses 44 and 45 individually have holes 46 that open to the outside of a case 8 and communicate with the threaded holes 43. With the housing cover 13 combined with a housing base 12, screws 47 are inserted individually into the respective holes 46 of the first and second bosses 44 and 45. Each screw 47 is an example of a fixing member. The distal end of each screw 47 is engaged in its corresponding threaded hole 43. Thereupon, the housing cover 13 and the housing base 12 are fixed to each other. In other words, the first and third protrusions 32 and 34 are bosses for fixing a display housing 14, and a harness 21 is grounded by using these bosses.

According to the portable computer 41 constructed in this manner, a film shield 26 of the harness 21 is grounded through respective conductor layers 35 of protrusions 32, 33 and 34, so that there is no need of providing any separate member for grounding. Thus, the portable computer 41 can be obtained enjoying reduced size and cost and improved assemblability.

If the first and third protrusions 32 and 34 are used also as bosses for screwing, as in the portable computer 41 according to the present embodiment, a space required by a grounding structure can be omitted or reduced, and the cost of the portable computer 41 can be further reduced.

The two protrusions 32 and 34 are used as the bosses for screwing according to the present embodiment, only one of the protrusions may be used to double as a boss for screwing. Alternatively, any of the protrusions may be used to double as a boss.

Figure 5:
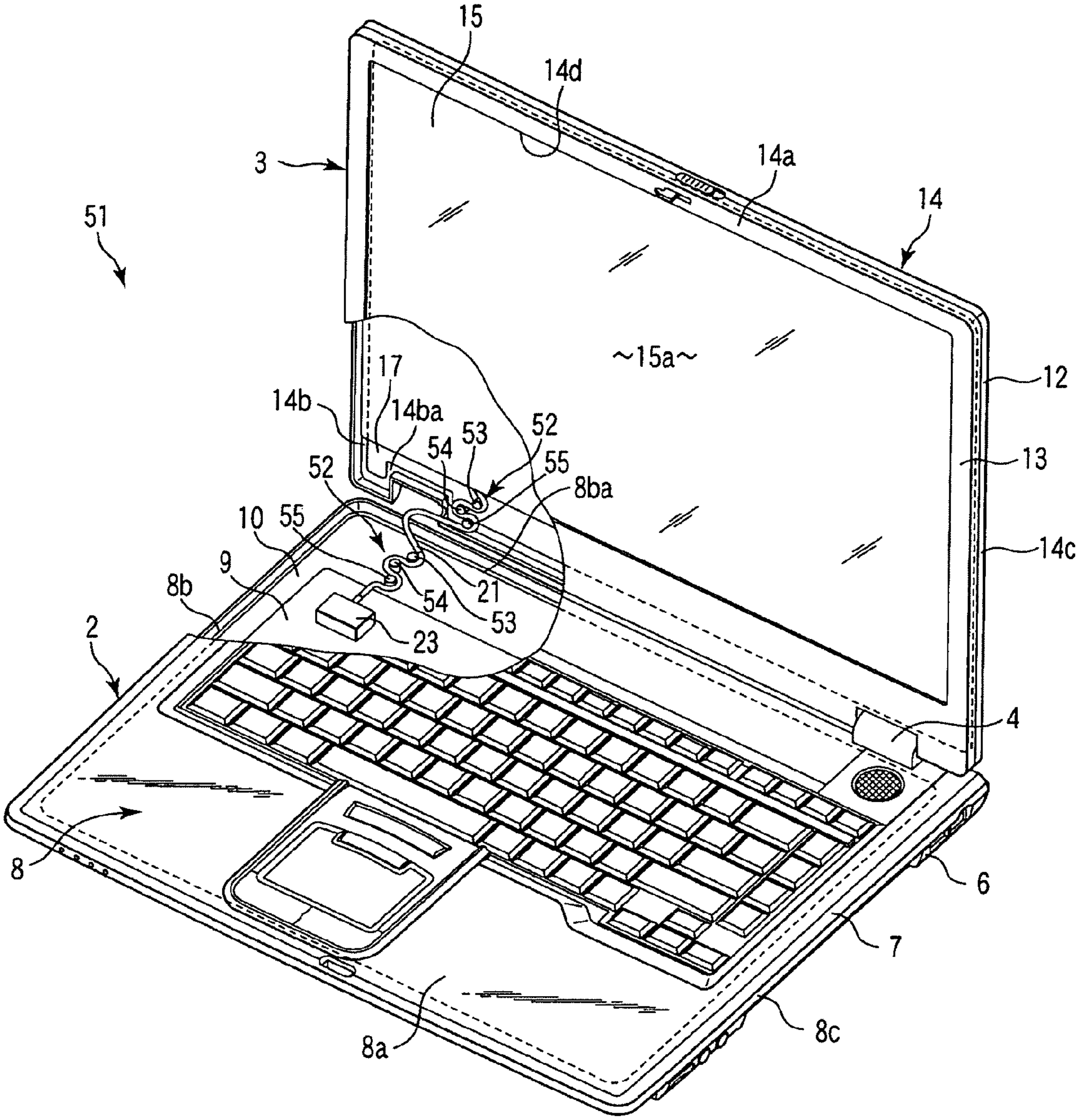
FIG. 5 is an exemplary sectional view of a portable computer according to a third embodiment of the invention.

A portable computer 51 as an electronic apparatus according to a third embodiment of the invention will now be described with reference to FIGS. 5 to 7. Like numerals are used to designate those configurations which have the same functions as those of the portable computer 1 according to the first embodiment, and a description thereof is omitted.

A body 2 and a display unit 3 of the portable computer 51 have their respective protrusive sections 52 therein. As shown in FIGS. 5 to 7, each protrusive section 52 is located in the path of a harness 21. The protrusive section 52 of the display unit 3 will now be described in detail. The protrusive section 52 of the display unit 3 has first, second, and third protrusions 53, 54 and 55 that individually protrude from an inner surface 14*ba* of a rear wall 14*b*.

The first to third protrusions 53 to 55 are staggered in, for example, two rows. In other words, they are arranged in a zigzag. The width of an example of a gap between the first and second protrusions 53 and 54 is greater than the outside diameter of a film shield 26 of the harness 21. The width of an example of a gap between the third and second protrusions 55 and 54 is greater than the outside diameter of the film shield 26. The first to third protrusions 53 to 55 have conductor layers 35 on their respective side faces S.

Figure 6:
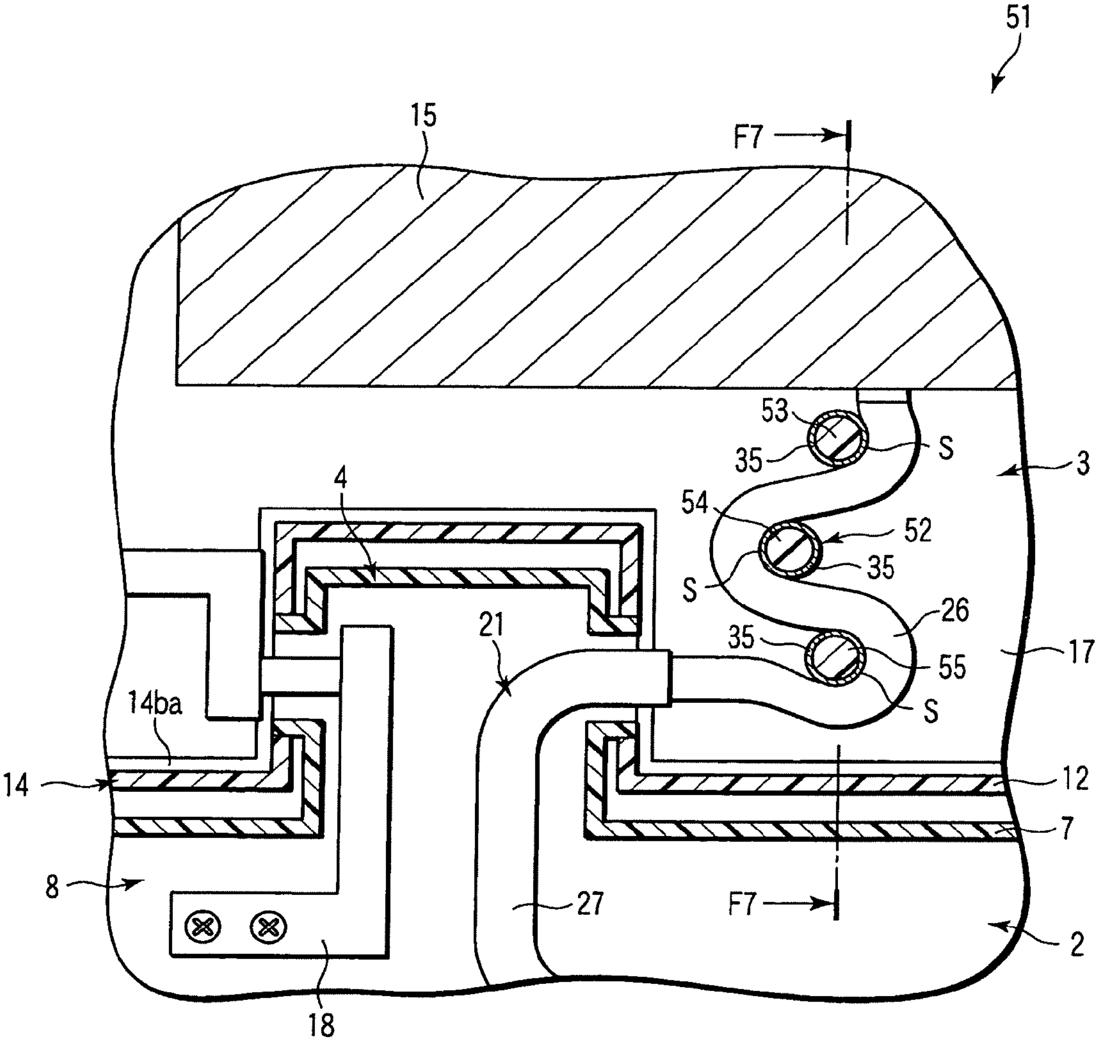
FIG. 6 is an exemplary sectional view of protrusions according to the third embodiment.
Figure 7:
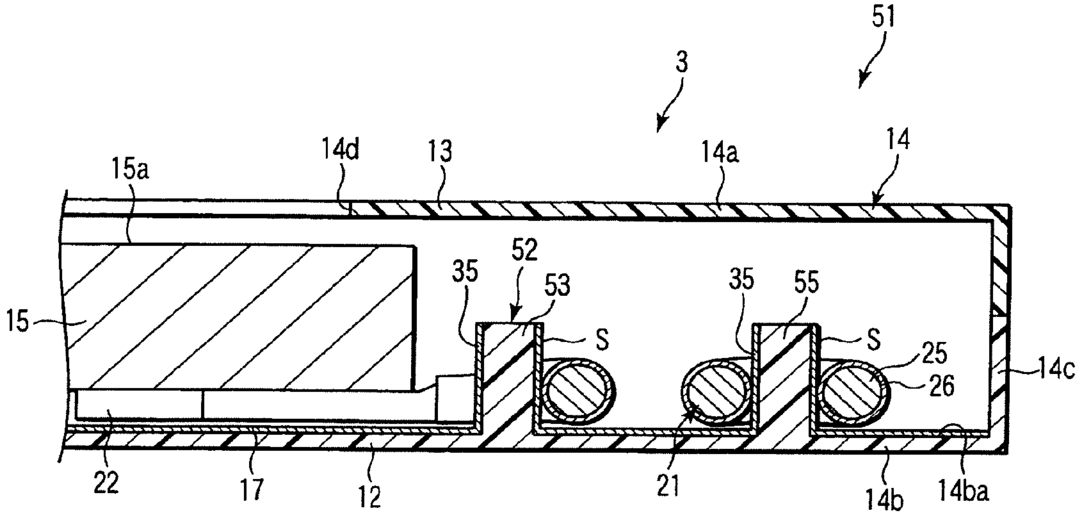
FIG. 7 is an exemplary sectional view of the protrusions taken along line F7-F7 of FIG. 6.

As shown in FIG. 6, the harness 21 has its trunk portion alternately caught by the first to third protrusions 53 to 55 on its left- and right-hand side faces and is led around along the protrusions 53 to 55 for use as guides. The harness 21 is led around along the respective side faces S of the protrusions 53 to 55 and extends entwined around the protrusions 53 to 55 so as to be wound on the side faces S.

More specifically, the first to third protrusions 53 to 55 are arranged in two rows, right and left, as shown in FIG. 6. The harness 21 extends along the respective right-hand side faces of the first and third protrusions 53 and 55 in the right-hand row and the left-hand side face of the second protrusion 54 in the left-hand row. Thus, the harness 21 extends via the side faces that are situated in outer peripheral regions of the protrusive section 52.

The harness 21 is kept in a meandering form such that its opposite side faces, right and left, are alternately supported by the first to third protrusions 53 to 55 that are arranged in a zigzag.

Alternatively, the harness 21 may be formed extending along the respective left-hand side faces of the protrusions in the right-hand row and the right-hand side face of the protrusion in the left-hand row, that is, via the side faces that are situated in inner peripheral regions of the protrusive section 52, as in the arrangement shown in FIG. 2.

Each of the first to third protrusions 53 to 55 is not limited to the shape of a cylinder but may be in the shape of, for example, a wall that extends along the harness 21. If that surface of each protrusion which touches the harness 21 is in the form of a curved surface, the ground connection can be achieved with a lower electrical resistance.

The following is a description of the operation of the portable computer 51.

Since the width of each of the gaps between the first to third protrusions 53 to 55 is greater than the thickness of the harness 21, the harness 21 cannot be fixed by the protrusions 53 to 55. Since the harness 21 also extends into the body 2 through the hinge sections 4, it stretches or bends as the display unit 3 is opened or closed. Thus, the harness 21 slightly shifts in position as the display unit 3 is opened or closed.

Since the left- and right-hand side faces of the harness 21 are entwined around the protrusions 53 to 55 so as to be in contact with them, however, the harness 21 never fails be kept in contact with at least one of the protrusions even if its position is somewhat shifted. As the harness 21 is kept in contact with at least one of the protrusions 53 to 55, the film shield 26 is continually grounded to a second ground layer 17.

According to the portable computer 51 constructed in this manner, the film shield 26 of the harness 21 is grounded through the respective conductor layers 35 of the protrusions 53, 54 and 55, so that there is no need to provide any separate member for grounding. The film shield 26 can be grounded by entwining the harness 21 around the protrusions 53 to 55. Thus, a portable computer 51 enjoying reduced size and cost and improved assemblability can be obtained.

The protrusions are not limited to three in number but may be two or four or more. Further, the array of the protrusions is not limited to the zigzag configuration.

Figure 8:
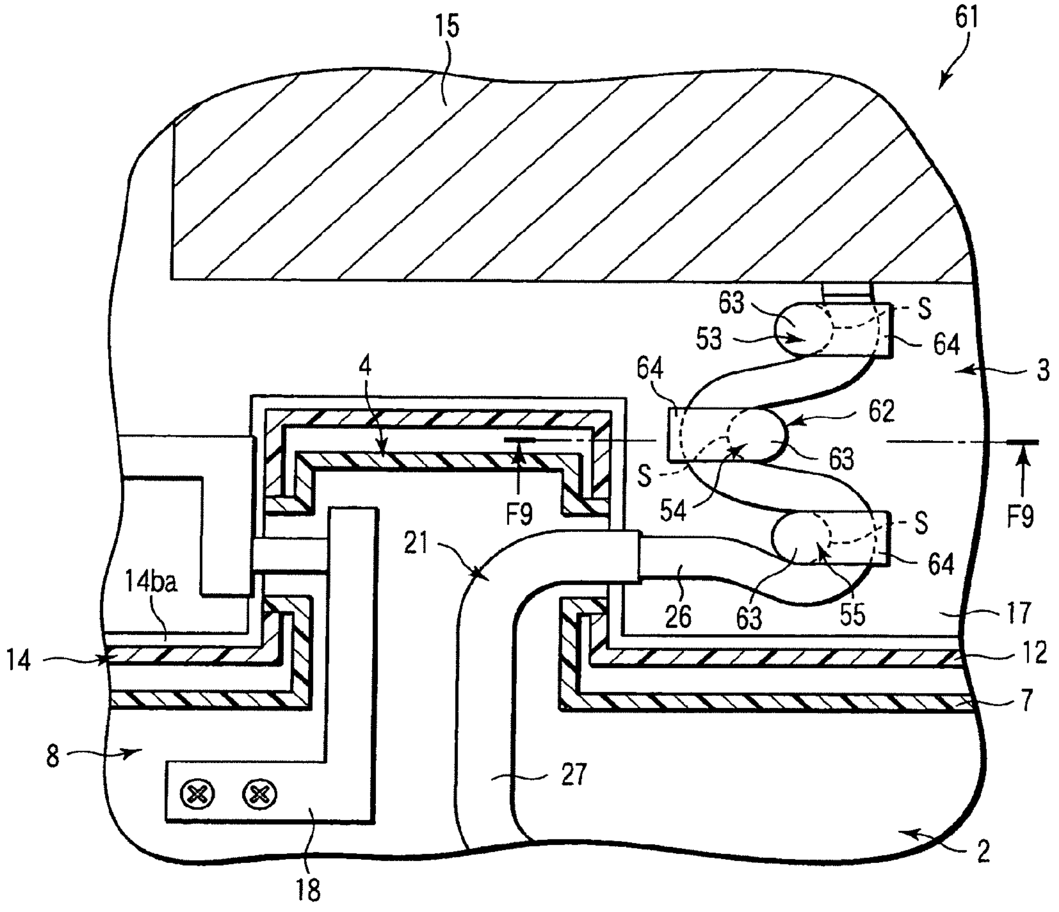
FIG. 8 is an exemplary sectional view of a portable computer according to a fourth embodiment of the invention.
Figure 9:
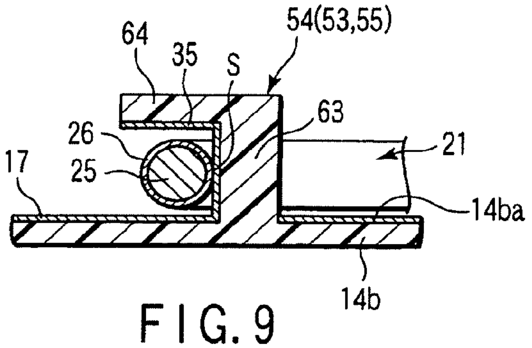
FIG. 9 is an exemplary sectional view of the protrusions taken along line F9-F9 of FIG. 8.

A portable computer 61 as an electronic apparatus according to a fourth embodiment of the invention will now be described with reference to FIGS. 8 and 9. Like numerals are used to designate those configurations which have the same functions as those of the portable computers 1 and 51 according to the first and third embodiments, and a description thereof is omitted.

The portable computer 61 has a protrusive section 62. First, second, and third protrusions 53, 54 and 55 of the protrusive section 62 each have a protrusion body 63 that protrudes from a housing base 12 and an extended portion 64 that extends parallel to an inner surface 14*ba* from a projected end of the protrusion body 63. Specifically, the first to third protrusions 53 to 55 are claw-shaped. The extended portion 64 extends from the protrusion body 63 so as to overhang a harness 21.

According to the portable computer 61 constructed in this manner, a film shield 26 of the harness 21 is grounded through respective conductor layers 35 of the protrusions 53, 54 and 55, so that there is no need to provide any separate member for grounding. Thus, a portable computer 61 enjoying reduced size and cost and improved assemblability can be obtained.

If the first to third protrusions 53 to 55 are claw-shaped, in particular, the harness 21 cannot be easily disengaged from the protrusive section 62. Thus, the film shield 26 can be grounded more securely.

Figure 10:
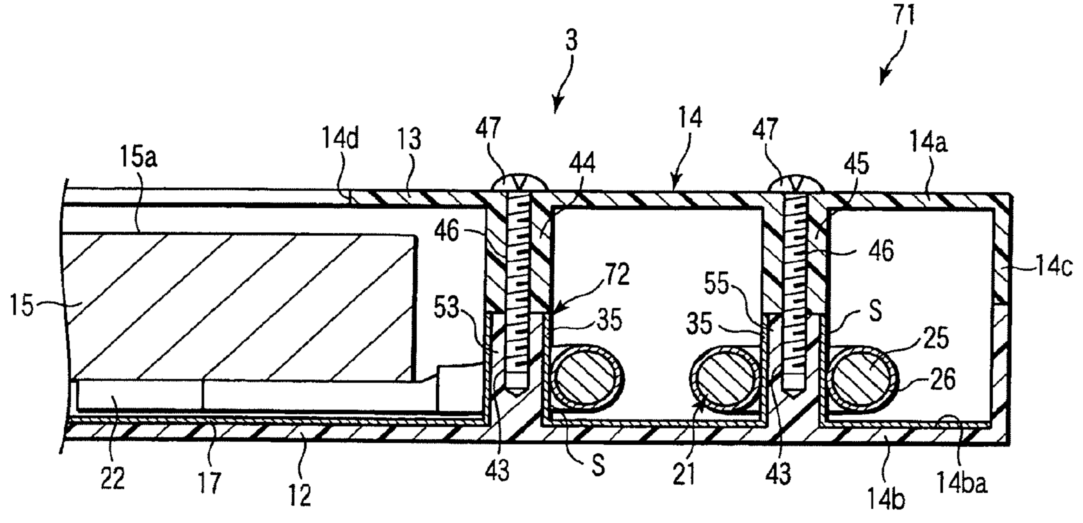
FIG. 10 is an exemplary sectional view of a portable computer according to a fifth embodiment of the invention.

A portable computer 71 as an electronic apparatus according to a fifth embodiment of the invention will now be described with reference to FIG. 10. Like numerals are used to designate those configurations which have the same functions as those of the portable computers 1, 41 and 51 according to the first, second, and third embodiments, and a description thereof is omitted.

The portable computer 71 has a protrusive section 72. First and third protrusions 53 and 55 of the protrusive section 72 individually have threaded holes 43 in their respective top portions. In other words, the first and third protrusions 53 and 55 are bosses for fixing the display housing 14, and a harness 21 is grounded by these bosses that double for the purpose.

According to the portable computer 71 constructed in this manner, a film shield 26 of the harness 21 is grounded through respective conductor layers 35 of the protrusions 53, 54 and 55, so that there is no need to provide any separate member for grounding. As in the second embodiment, moreover, a portable computer 71 enjoying further reduced size and cost and improved assemblability can be obtained.

Although the portable computers 1, 41, 51, 61 and 71 according to the first to fifth embodiments have been described herein, embodiments of the present invention is not limited to these embodiments. For example, the first to third protrusions 32 to 34 or 53 to 55 are not restricted to special shapes but elliptic or polygonal protrusions may be suitably selected for use. The film shield 26 need not always be a conductor film that adjusts the first and second ground layers 10 and 17 to the same potential but may alternatively be provided for some other purposes.

In the portable computers 41 and 71 according to the second and fifth embodiments, the protrusions 32, 34, 53 and 55 are provided individually with the engaging holes 43, and the bosses 44 and 45 with the holes 46. Alternatively, however, the protrusions 32, 34, 53 and 55 may be provided individually with the holes 46, and the bosses 44 and 45 with the holes 43. In this case, the screws 47 are fitted into the engaging holes 43 of the housing cover 13 through the holes 46 in the housing base 12, individually.

The harness 21 is not restricted to the use for the liquid crystal display module 15 but may be of any type that is configured, for example, to connect a plurality of circuit boards. Electronic apparatuses to which the embodiments of the invention are applicable are not limited to portable computers. The embodiments are applicable to any other kinds of electronic apparatuses, such as cell phones, digital cameras, video cameras, personal digital assistants, etc.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:

a first housing comprising a first ground;

a first module in the first housing;

a second housing;

a hinge pivotably connecting the first housing and the second housing;

a cable extending between inside the first housing and inside the second housing through the hinge, the cable comprising an electric wire electrically connected to the first module, an electrically conductive film enclosing the electric wire, and an insulating film enclosing the conductive film, the cable comprising a portion which extends in a direction crossing a direction from the first module toward the hinge and in which the conductive film is exposed outside the insulating film; and a plurality of first protrusions protruding from an inner surface of the first housing, the plurality of first protrusions configured to contact and support the portion of the cable between the plurality of first protrusions, each of the plurality of first protrusions comprising, on a peripheral surface thereof, a first conductor configured to contact the conductive film of the cable and electrically connected to the first ground.

2. The electronic apparatus according to claim 1, wherein the second housing comprises a second ground, the electronic apparatus further comprising a plurality of second protrusions protruding from an inner surface of the second housing, the plurality of second protrusions configured to contact and support the cable between the plurality of second protrusions, each of the plurality of second protrusions comprising, on a peripheral surface thereof, a second conductor configured to contact the conductive film of the cable and electrically connected to the second ground.

3. The electronic apparatus according to claim 1, wherein the second housing comprises a second module, and the electric wire of the cable electrically connects the first module and the second module.

4. The electronic apparatus according to claim 3, wherein the first module is a circuit board, and the second module is a display module.

5. The electronic apparatus according to claim 1, wherein the plurality of first protrusions comprise three protrusions, and the cable is supported by peripheral surfaces of the three protrusions, the cable meandering among the three protrusions.

6. The electronic apparatus according to claim 5, wherein the cable is held between the three protrusions in such a manner that the cable is fixed between the three protrusions.

7. The electronic apparatus according to claim 1, wherein each peripheral surface of the plurality of first protrusions comprises a curved surface which contacts the conductive film of the cable.

8. The electronic apparatus according to claim 1, wherein the first housing comprises a first housing member comprising the plurality of first protrusions, a second housing member attached to the first housing member, and a fixing member which fixes the second housing member to the first housing member, at least one of the plurality of first protrusions comprising a hole configured to receive the fixing member.

9. The electronic apparatus according to claim 1, wherein the cable is led around along the respective side faces of the plurality of first protrusions and extends entwined around the plurality of first protrusions.

10. The electronic apparatus according to claim 1, wherein the plurality of first protrusions are arranged at intervals of a width greater than a thickness of the cable.

11. The electronic apparatus according to claim 1, wherein the second housing comprises a second ground, and the cable is electrically connected to the second ground in the second housing and configured to electrically connect the first ground and the second ground.

12. The electronic apparatus according to claim 11, wherein the first ground and the second ground are the same potential through the cable.

13. The electronic apparatus according to claim 1, wherein the first housing comprises an end portion connected to the hinge, and the plurality of first protrusions are located in the end portion of the first housing.

14. The electronic apparatus according to claim 1, wherein the plurality of first protrusions are formed integrally with the inner surface of the first housing.

15. An electronic apparatus comprising:

a first housing comprising a first ground;

a plurality of protrusions on an inner surface of the first housing, at least one of the plurality of protrusions comprising, on a peripheral surface thereof, a first conductor electrically connected to the first ground;

a second housing comprising a second ground;

a hinge pivotably connecting the first housing and the second housing; and a cable extending between inside the first housing and inside the second housing through the hinge, supported by the plurality of protrusions, electrically connected to the first conductor in the first housing, and electrically connected to the second ground in the second housing, the cable electrically connecting the first ground and the second ground, wherein the first housing comprises a first housing member comprising the plurality of protrusions, a second housing member attached to the first housing member, and a fixing member which fixes the second housing member to the first housing member, at least one of the plurality of protrusions comprising an aperture configured to receive the fixing member.

* * * * *